United States Patent [19]

Weng

[11] Patent Number: 5,918,187

[45] Date of Patent: Jun. 29, 1999

[54] ELECTRIC CHARGER FOR A MOBILE TELEPHONE USABLE IN A HOUSE AND IN A CAR

[76] Inventor: Ying-Chao Weng, P.O. Box 90, Tainan City, 704, Taiwan

[21] Appl. No.: 08/813,322

[22] Filed: Mar. 10, 1997

[51] Int. Cl.[6] .................................. H04B 1/38; H04M 1/00

[52] U.S. Cl. .......................... 455/573; 455/572; 320/111; 320/114; 320/115

[58] Field of Search ................................ 455/572, 573, 455/550; 320/108, 111, 115, 113, 114; 379/438, 447, 450, 428; 439/638, 655; D14/142, 140, 240, 256, 138, 137

[56] References Cited

U.S. PATENT DOCUMENTS 5,736,830 4/1998 Weng ........................................ 320/2

*Primary Examiner*—Dwayne D. Bost
*Assistant Examiner*—Raymond B. Persino

[57] ABSTRACT

An electric charger for a mobile telephone usable in a house and in a car includes a transformer, a car charge plug, a cap, and a shield. The transformer has an indoor plug on a first side and a car plug base movably fixed on a second side. The car plug base can be swung pivotally up to a right angle in case of use for charging a mobile telephone in car. The indoor plug is hidden with a cap pivotally combined with the transformer and the cap is able to be swung open to expose the indoor plug for charging in a house.

3 Claims, 6 Drawing Sheets

1

ELECTRIC CHARGER FOR A MOBILE TELEPHONE USABLE IN A HOUSE AND IN A CAR

BACKGROUND OF THE INVENTION

This invention concerns an electric charger for a mobile telephone usable in a house and in a car, and having an integral appearance.

A known conventional electric telephone for a mobile telephone usable in a house and in a car as shown in FIG. 1 includes a transformer 10 usable in a house, and a car charge plug 11 only usable in a car. The transformer 10 has a cord 100 connected with a socket 101 at one end, and the car charge plug 11 has a cord 110 connected with a terminal plug 111.

When the conventional charger is to be used indoors, the terminal plug 111 of the car charge plug 11 is connected with a charge socket of a mobile telephone and the car charge plug 11 is connected with the plug 101 of the transformer 10. Then the transformer 10 is inserted in an electric socket in a wall of a house.

However, the structure of the conventional charger is rather complicated, having two cord wires 100, 110, and the socket 101.

SUMMARY OF THE INVENTION

A main purpose of the invention is to offer an electric charger for a mobile telephone usable in a house and in a car, needing no other extra convert plug.

One more purpose of the invention is to offer an electric charger for a mobile telephone usable in a house and in a car, having an attractive integral appearance.

The feature of the invention is a transformer provided with an indoor plug on a first side, and a car plug base on a second side for a car plug to be combined with and rest therein in case of storing and able to be swung up for a right angle relative to the car plug base in case of using for charging a mobile telephone in a car.

BRIEF DESCRIPTION OF DRAWINGS

This invention will be better understood by referring to the accompanying drawings, wherein.

DESCRIPTION OF THE PREFERRED EMBODIMENT

Figure 1:
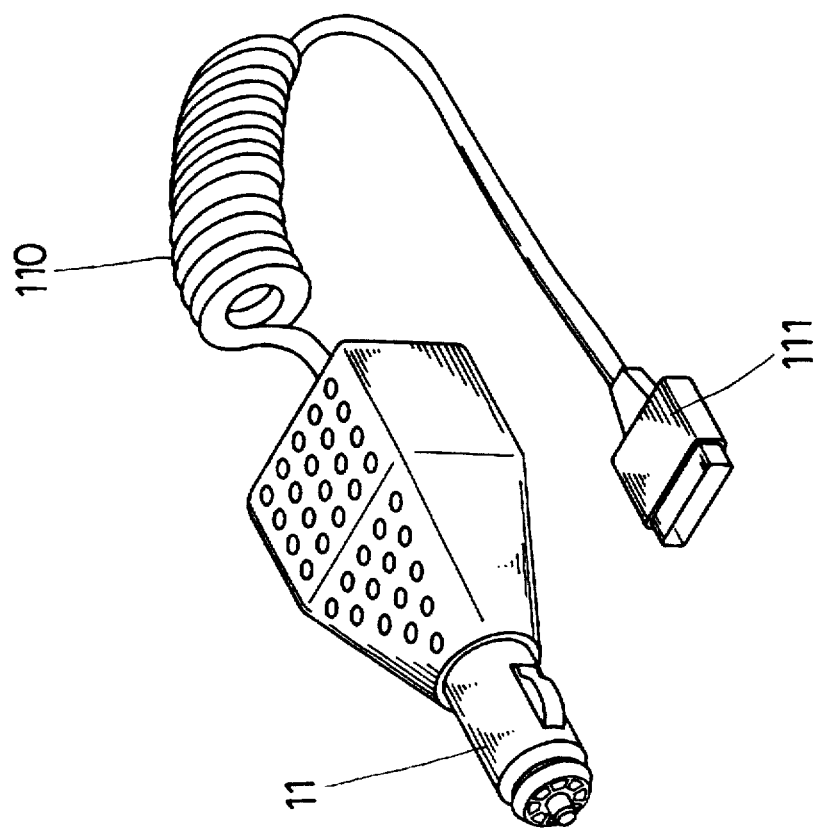
FIG. 1 is a perspective view of a known conventional electric charger for a mobile telephone usable in a house and in a car.
Figure 1:
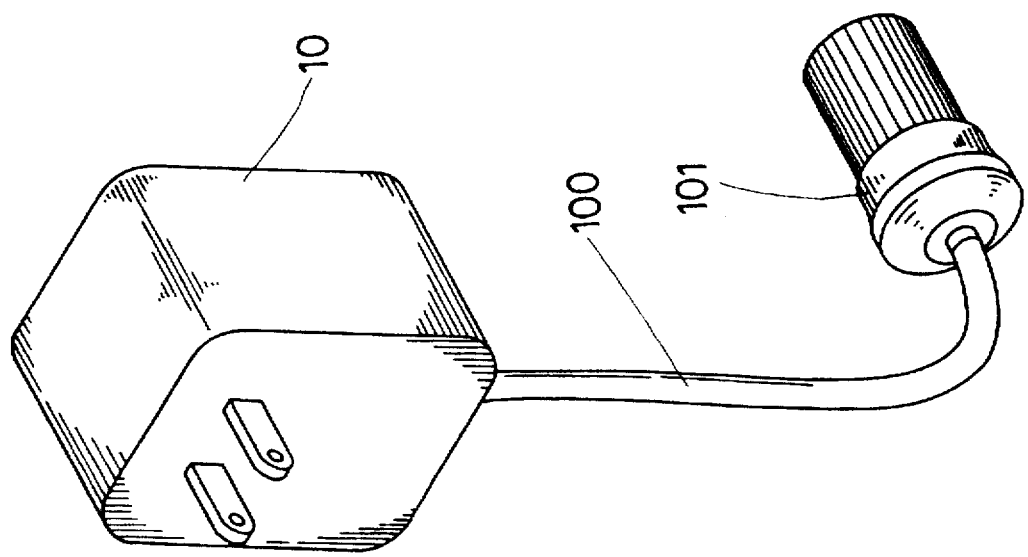
Figure 2:
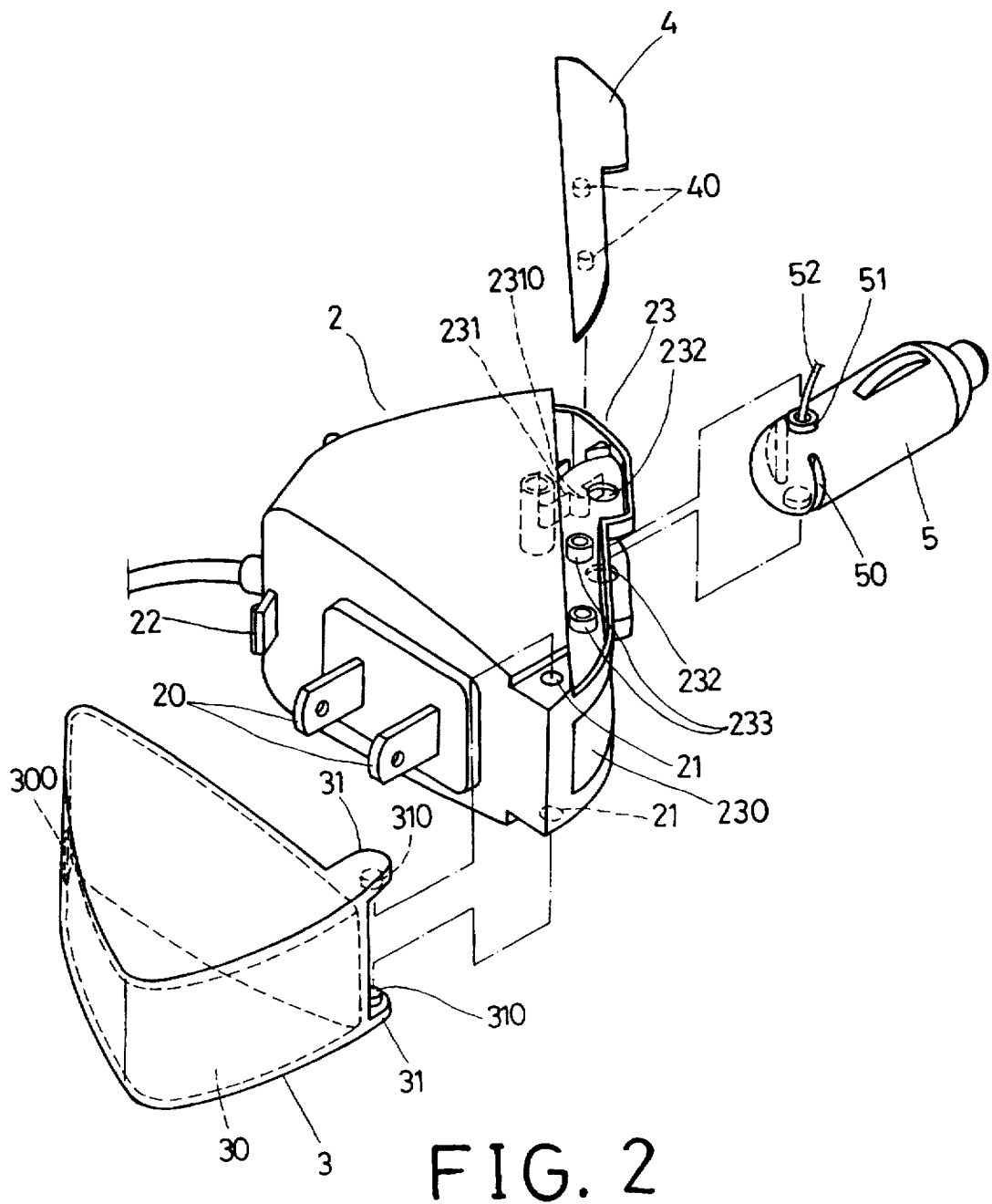
FIG. 2 is an exploded perspective view of a preferred embodiment of an electric charger for a mobile telephone usable in a house and in car in the present invention.

A preferred embodiment of an electric charger for a mobile telephone usable in a house and in a car, as shown in FIG. 2, includes a transformer 2, a cap 3, a shield 4 and a car plug 5 as main components combined together.

The transformer 2 is substantially triangular-shaped, having an indoor plug 20 fixed on a first side, a pivot hole 21 respectively in an upper surface and a lower surface of the corner of the first side and a second side, a projecting hook 22 on an intermediate portion of the corner of the first side and a third curved side, a car plug base 23 formed on the second side. The car plug base 23 has a plug cavity 230 for receiving the car plug 5, an elastic piece 231 with a projection 2310 formed on the surface of the plug cavity 230, a pivot hole 232 respectively bored in an upper surface and in a bottom surface of the plug cavity 230, and two spaced rings 233, 233 on an upper surface.

The cap 3 encloses above the indoor plug 20 of the transformer 2, having a hollow chamber 30, a hook groove 300 formed in an inner surface, a projecting ear 31 respectively projecting from an upper edge and a lower edge of an inner side, and a projecting pivot 310 respectively protruding up or down from each projecting ear 31.

The shield 4 is combined with an upper portion of the car plug base 23 of the transformer 2, having two projections 40, 40 which fit firmly in the rings 233, 233 to conceal the car plug base 23.

The car plug 5 is deposited in the plug cavity 230 of the car plug base 23 of the transformer 2, having two vertical engagement slots 50, 50 for receiving the elastic pieces 23, 23, and two opposite annular projections 51, 51 formed to correspond to the two pivot holes 232, 232 of the transformer 2. A wire 52 extends through each projection 51.

Figure 3:
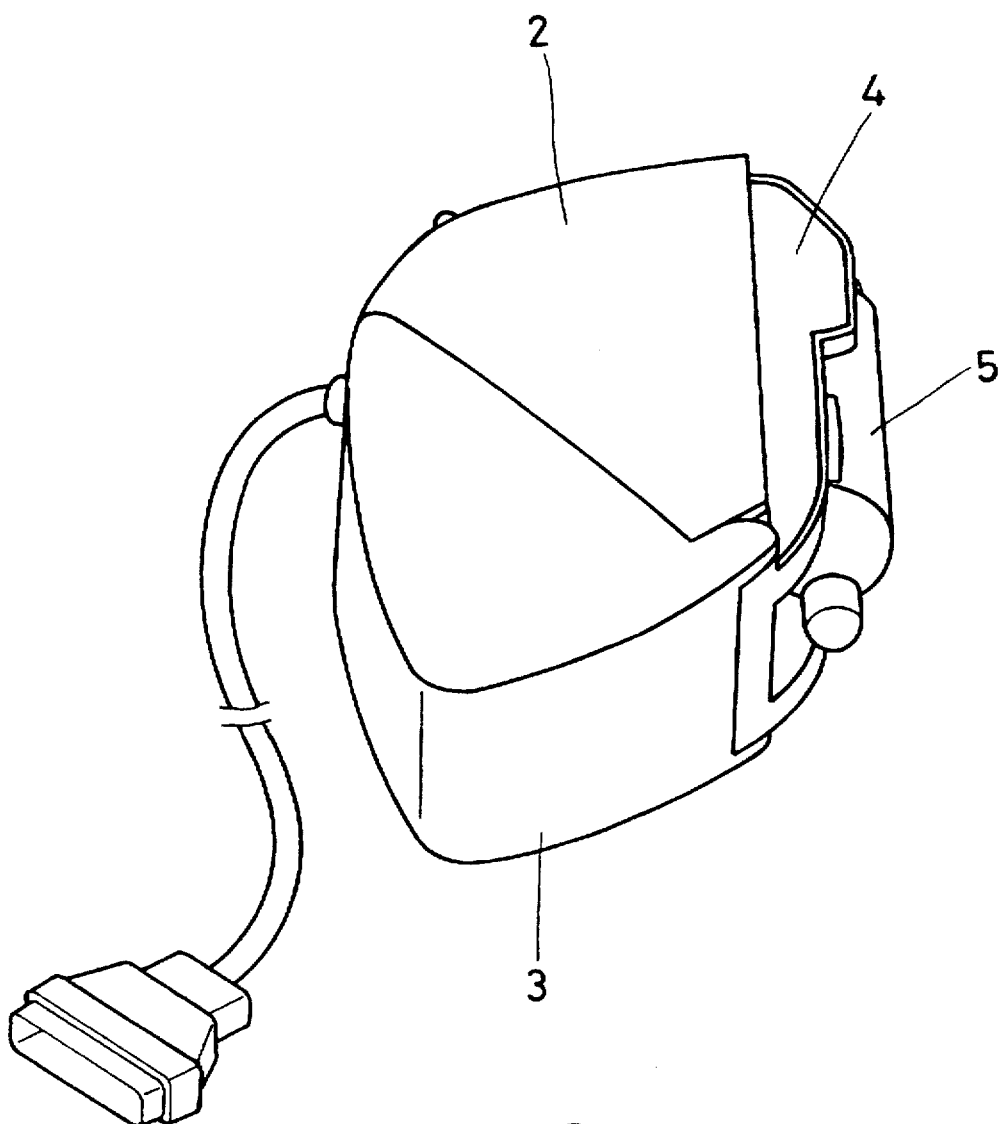
FIG. 3 is a perspective view of the preferred embodiment of an electric charger for a mobile telephone usable in a house and in a car in the present invention.
Figure 4:
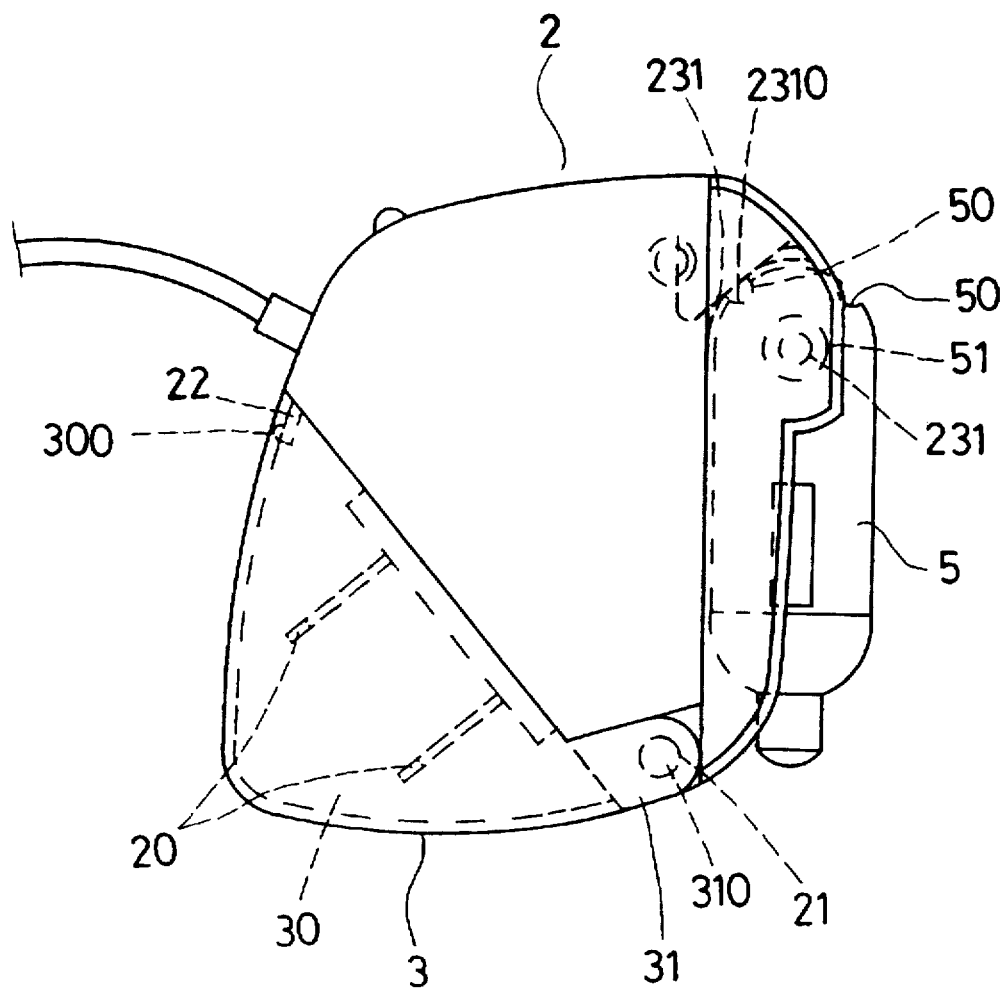
FIG. 4 is a side view of the preferred embodiment of an electric charger for a mobile telephone usable in a house and in a car in the present invention.

In assembling, referring to FIGS. 3 and 4, the car plug 5 is first disposed in the plug cavity 230 of the car plug base 23, with the two annular projections 51, 51 fitting in the pivot holes 232, 232 with the wires 52, 52 passing through the annular projections 51, 51 and then through the pivot holes 232, 232 to be connected with an inner side of the transformer 2, and with the elastic piece 231 having its projection 2310 engaging with one of the engagement slots 50 of the car plug 5, permitting the car plug 5 to be secured in the plug cavity 230 of the car plug base 23. Then the cap 3 is combined with the transformer 2, with the indoor plug 20 being covered with the cap 3, with the two projecting pivots 310, 310 of the two projecting ears 31, 31 respectively fitted in the two pivot holes 21, 21 of the indoor plug 20, and with the hook groove 300 engaging with the projecting hook 22 of the transformer 2. Then the shield 4 is combined with an upper portion of the car plug base 23, and with the two projections 40, 40 fitting in the two rings 233, 233 of the upper surface of the car plug base 23. This completes the assembly of the electric charger of the invention. The transformer 2 is thus provided with both the car plug 5 and the indoor plug 20 and is ready for charging a mobile telephone either in a house or in a car.

Figure 5:
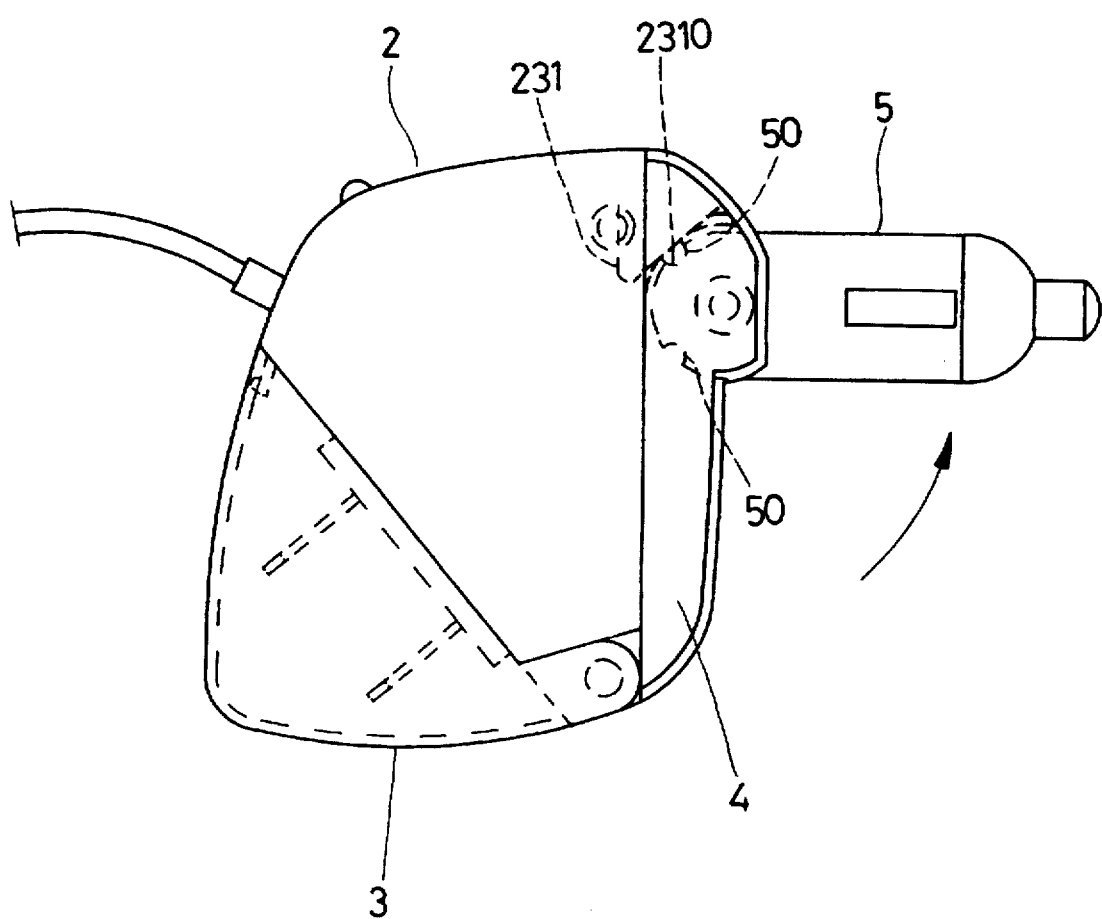
FIG. 5 is a side view of the preferred embodiment of an electric charger for a mobile telephone in the present invention, showing it used in a car; and, FIG. 6 is a side view of the preferred embodiment of an electric charger for a mobile telephone in the present invention, showing it used in a house.

If this charger is used in a car, referring to FIG. 5, the car plug 5 is swung outward for 90 degrees or so from a folded condition wherein the can plug 5 is disposed in the car plug base 23. The elastic piece 231 engaged by the car plug 5 will have its projection 2310 disengage from one engagement slot 50 of the car plug 5 and engage the other of the engagement slot 50 so that the car plug 5 is secured in a usable condition. The car plug 5 can be connected by a socket in a car, and the indoor plug 20 is hidden with the cap 3, thus presenting an integral appearance.

Figure 6:
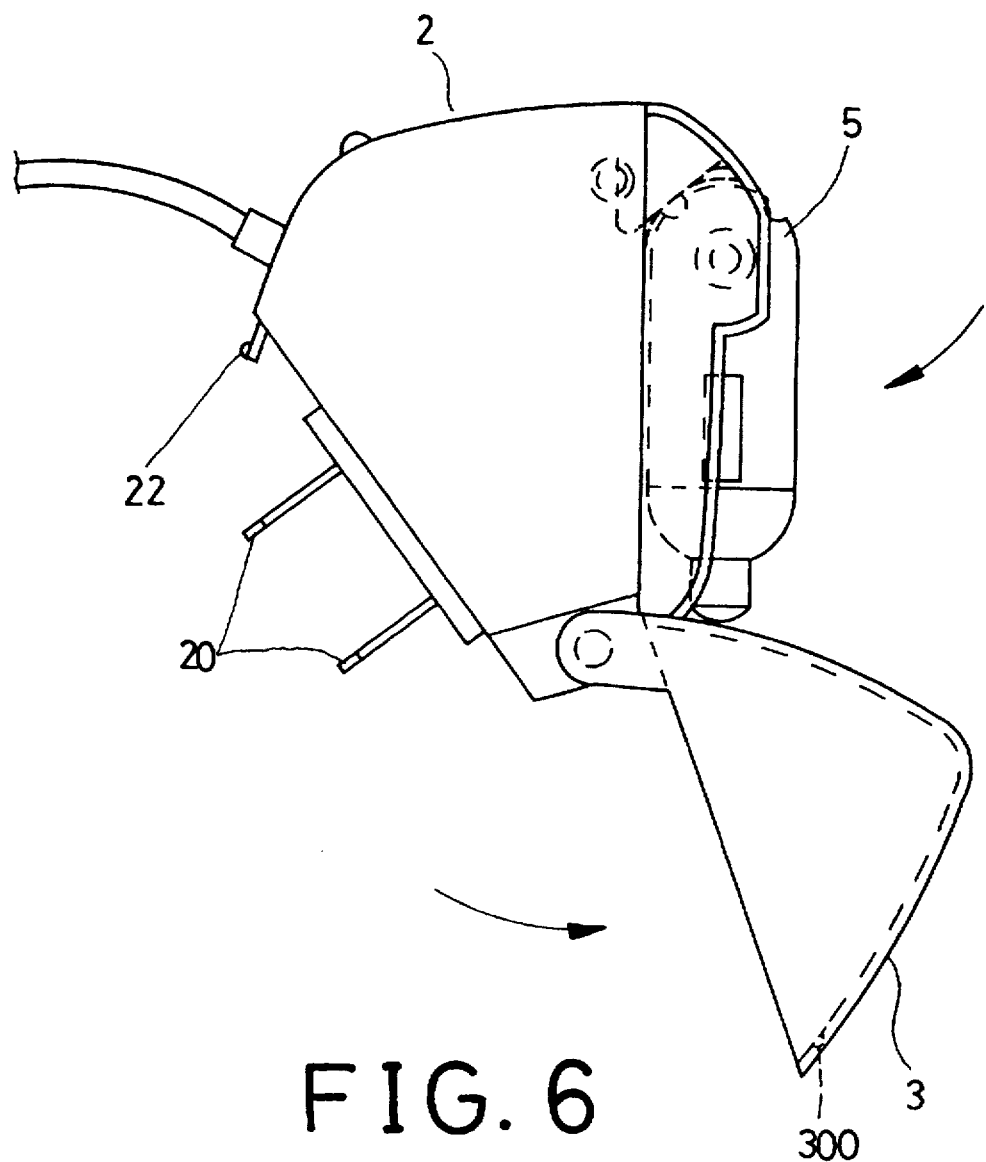

Provided that the charger is to be used in a house, referring to FIG. 6, the engagement groove 300 of the cap 3 is pulled outward, disengaging the projecting hook 22 from the groove 300 of the cap 3, with the cap 3 being swung with the projections 310, 310 as pivots, exposing the indoor plug 20 so that the indoor plug 20 can be inserted in an electric socket of a wall in a house. At the same time, the cap plug 5 has been swung into a folded condition thereby from the usable condition, presenting an integral appearance.

As can be understood from the above description, the charger for a mobile telephone of the invention has the following advantages.

1. The transformer is provided with two kinds of plugs usable in a house and in a car, needing no other sockets, and is convenient to use.

2. In case of using it in a car, the indoor plug is hidden by the cap, and in case of using it in a house, the car plug is folded to lie in the car plug base formed in one side of the transformer, thus maintaining an integral appearance while in use.

While the preferred embodiment of the invention has been described above, it will be recognized and understood that various modifications may be made thereto and the appended claims are intended to cover all such modifications which may fall within the spirit and scope of the invention.

What is claimed is:

1. An electric charger for a mobile telephone usable both in a house and in a car, the charger comprising:
    a) a substantially triangular-shaped transformer having a first flat side, a second flat side and a third curved side, an indoor plug fixed on the first flat side, an inwardly curved car plug base formed in the second flat side, a pair of spaced pivot holes at a corner defined by the first and second flat sides, and a projecting hook at a corner defined by the first flat side and the third curved side;
    b) a cap having an inner hollow chamber for enclosing the indoor plug, the cap including a hook groove for engaging the projecting hook, a pair of projecting flat ears, each ear including a pivot projection engaging a pivot hole to permit the cap to pivot between open and closed positions relative to the indoor plug; and
    c) a car plug disposed within the curved car plug base.

2. An electric charger for a mobile telephone usable both in a house and in a car, the charger comprising:
    a) a substantially triangular-shaped transformer having a first flat side, a second flat side, an indoor plug fixed on the first flat side, and a car plug base formed on the second flat side;
    b) a cap having an inner hollow chamber for enclosing the indoor plug;
    c) the car plug base including an inwardly curved cavity, an elastic piece secured on an inner surface of the cavity, the elastic piece including a top projection, a pivot hole formed in each of an upper flat wall and a lower flat wall defining the cavity;
    d) a car plug including a pair of opposed slots formed in a rear portion of the plug for alternative engagement by the elastic piece, an annular projection on each of an upper side and a lower side of the plug, a wire extending through the annular projections, and the annular projections engaging the pivot holes to permit the car plug to be pivoted inwardly into the cavity for storage wherein the elastic piece engages one of the opposed slots and outwardly into a position of use wherein the elastic piece engages the other of the opposed slots.

3. An electric charger for a mobile telephone usable both in a house and in a car, the charger comprising:
    a) a substantially triangular-shaped transformer having a first flat side, a second flat side, an indoor plug fixed on the first flat side, an inwardly curved car plug base formed on the second flat side, the car plug base including an upper side, and a shield fixed on the upper side for providing an integral appearance;
    b) a cap having an inner hollow chamber for enclosing the indoor plug; and
    c) a car plug combined with the car plug base.

* * * * *